No. 882,819. PATENTED MAR. 24, 1908.
M. ERECKSON & J. O. JYSTAD.
SHOCK GATHERER
APPLICATION FILED FEB. 26, 1906. RENEWED OCT. 7, 1907.
2 SHEETS—SHEET 1.
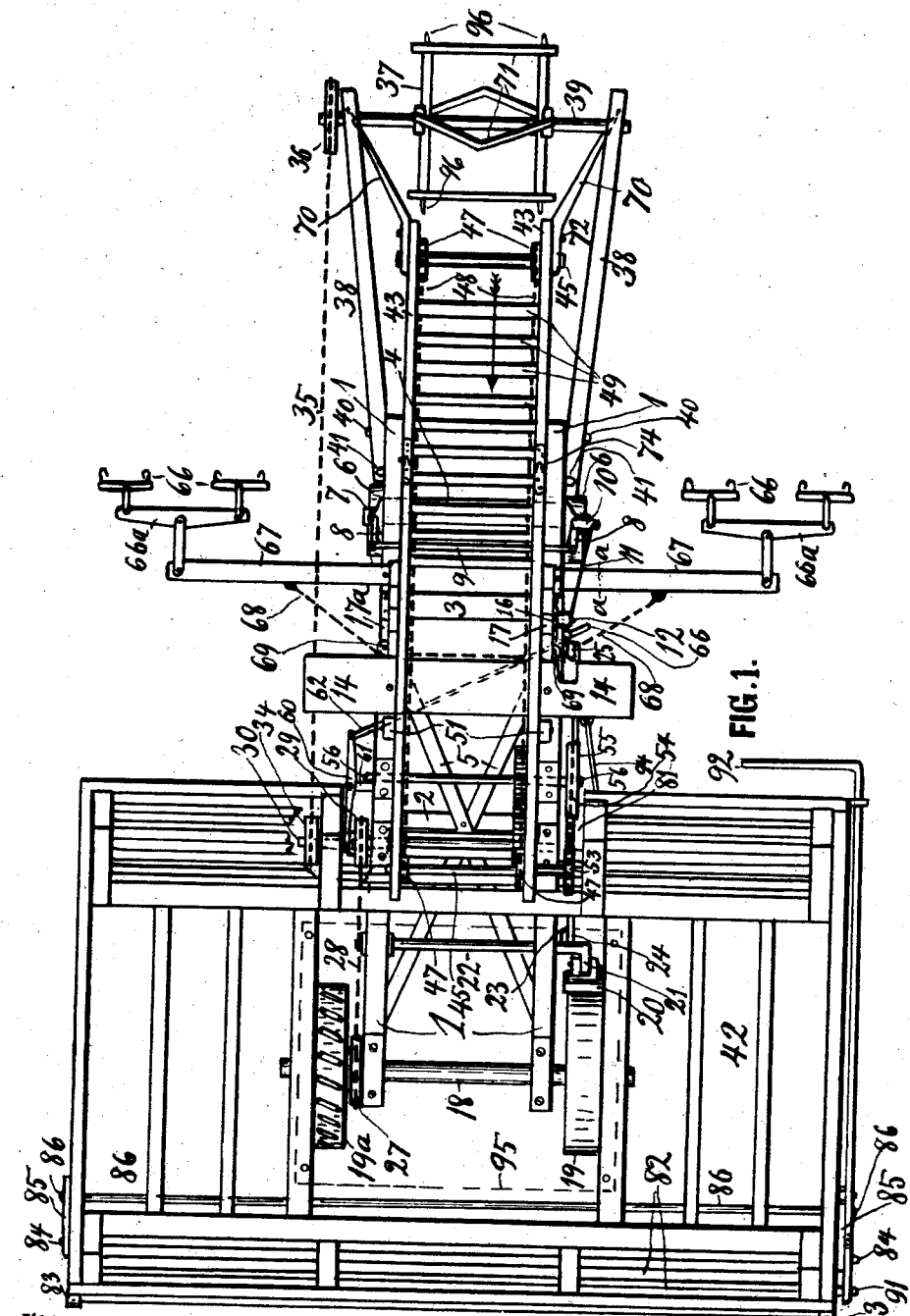
WITNESSES:
D. E. Carlsen.
L. C. Carlsen.
INVENTORS:
Martin Ereckson.
John O. Jystad.
BY their ATTORNEY: A. M. Carlsen.

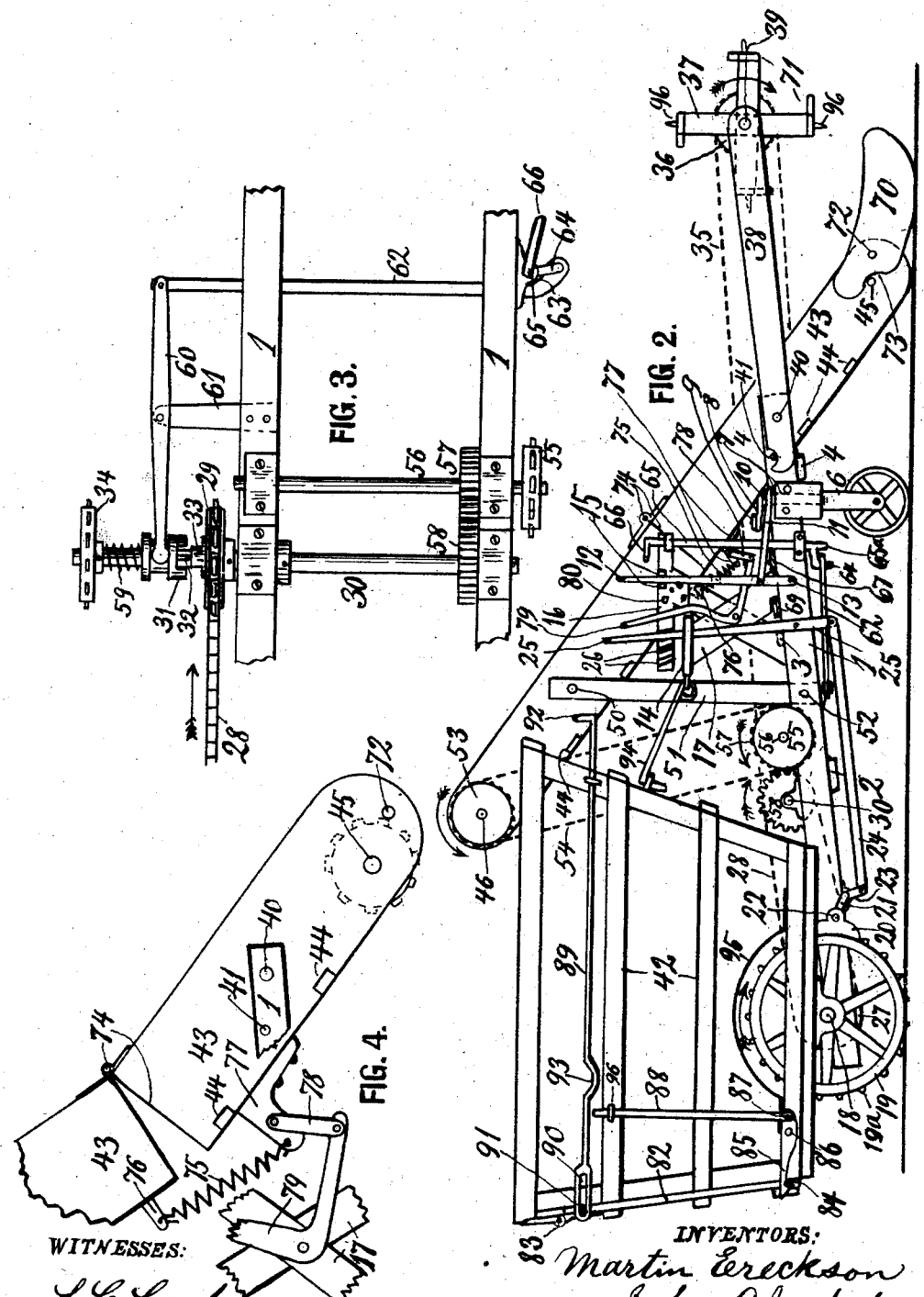

UNITED STATES PATENT OFFICE.

MARTIN ERECKSON AND JOHN O. JYSTAD, OF GALESBURG, NORTH DAKOTA.

SHOCK-GATHERER.

No. 882,819.         Specification of Letters Patent.         Patented March 24, 1908.

Application filed February 26, 1906, Serial No. 303,144. Renewed October 7, 1907. Serial No. 396,324.

*To all whom it may concern:*

Be it known that we, MARTIN ERECKSON and JOHN O. JYSTAD, citizens of the United States, residing at Galesburg, in the county of Traill and State of North Dakota, have invented certain new and useful Improvements in Shock-Gatherers; and we do declare the following to be a full, clear, and exact description of the invention, such as will enable others skilled in the art to which it appertains to make and use the same, reference being had to the accompanying drawings, and to the letters and figures of reference marked thereon, which form a part of this specification.

Our invention relates to devices for gathering, loading and hauling grain shocks from the field and deliver them at the threshing machine or other destination; and the object is to provide an efficient device for said purpose, which when drawn over the field will automatically pick up the shocks of grain and deposit them into a dumping box or receptacle forming a part of the device, and from which the load of shocks is easily dumped by a simple mechanism operated from the driver's seat. This and other objects we attain by the novel construction and arrangement of parts illustrated in the accompanying drawing, in which;—

Figure 1 is a top or plan view of our shock-gatherer as we may call it. Fig. 2 is a side elevation of Fig. 1 with the draft bar 67 in section at the line $a\,a$ in Fig. 1. Fig. 3 is an enlargement of certain parts in the middle of Fig. 1. Fig. 4 is an enlarged fraction of the elevator in Fig. 2.

Referring to the drawing by reference numerals, the main frame of the device or machine is formed of the two longitudinal bars or hounds 1, transverse bars 2, 3, 4 and the crossed oblique braces 5. The front end of this frame is carried by a pair of casters 6, whose journaled stems 7 are provided with rocker arms 8 connected by a pivoted transverse rod 9; one of the stems has a second rocker arm 10 connected by a link rod 11 to a hand lever 12, which is pivoted at 13 to the main frame, and enables the driver to steer the wheels 6, and to lock them so as to run straight forward by allowing the lever to spring in between the two lugs 15, which are formed on a metallic bracket 16, secured on an X-shaped frame 17 projecting upward from the main frame and carrying also the seat 14 for the driver; said seat extending across the main frame to the other side, where it is supported by a similar X-shaped frame 17$^a$ and may be used for a second driver or other rider.

The rear end of the main frame is carried by the axle 18 journaled to the frame and the supporting wheels 19, 19$^a$, of which the former may be loose on the axle and the latter, which has its face provided with corrugations or cleats so as to take hold of the ground and act as a traction wheel, may be either fixed on the axle or be connected therewith by a dog and ratchet wheel (not shown) on the well known principle used in farm machinery to enable a traction wheel to turn backward when necessary. The smooth wheel 19 may at the driver's will be held still by the brake shoe 20, operated by the arm 21 of a rockshaft 22, journaled to the main frame and having a second rocker arm 23 operated by a rod 24 and lever 25, which may be thrown into the various notches 26 in the bracket 16 and thus hold the brake with more or less or no pressure against the wheel as the incline or level of the ground may require.

Connected with the traction wheel 18$^a$, by means of the axle or otherwise, is a chain wheel 27, which by a link-belt or other chain 28 drives the chain wheel 29, which is loose on the shaft 30, so that the wheel 29 revolves constantly whenever the machine advances forward, but the shock-gathering mechanism, presently to be described, remains idle until a clutch-member 31, (see Fig. 3) sliding on said shaft and on a feather-key 32 fixed in the same, is thrown into contact with another clutch-member 33 on the the chain wheel 29, so that the shaft 30 revolves and with it the fixed sprocket wheel 34, which by means of a chain 35 and a sprocket wheel 36 revolves a reel 37, whose shaft 39 is journaled in a pair of arms 38 carried by the front end of the main frame; said arms are pivoted at 40 and have their short rear ends held down in normal position by stopping pins 41, so that the reel may yield upwardly when so required.

Upon the rear axle 18 is pivotally supported the rack 42, into which the shocks are elevated or carried by an elevator composed of the side boards or rails 43, cross bars 44 and shafts 46 on which are fixed sprocket wheels 47, of which the upper ones draw the chains or link belts 48, on which are fastened slats 49, (only partly shown in Fig. 1). Said elevator is supported by the pivot rods 40 and 50, the latter passing through two uprights 51, having their lower ends pivoted at 52 to the main frame. The elevator belt or apron is operated by the sprocket wheel 53 fixed on the end of the shaft 46, the link belt 54 and the sprocket wheel 55 fixed on the shaft 56; the latter shaft being revolved in the proper direction by the meshing gear wheels 57—58 fixed on their respective shafts and driven by the shaft 30. In this connection it may be stated that the clutch member 31 is normally held engaged with the member 33 by the spring 59, and is only held disengaged by the forked lever 60, fulcrumed on a bracket 61, and the link rod 62 having its opposite end curved at 63 and operated by the crank 64 of an upright suitably journaled rock-shaft 65 having a handle 66 by which the driver may turn the crank so that the spring 59 has a free chance to expand, or he may lock the spring in a compressed position with the coupling members separated by turning the crank 64 beyond the "dead center" with reference to the shaft or rod 65, so that the spring 59 draws the rod 62 with its curve 63 to a stopping position against the shaft 65, or in the present instance against a projecting end 65$^a$ of said shaft, (shown in Fig. 2.) It is evident that by turning upward the crank or wrist pin 64, the rod 62 will rest against the shaft proper and the projection 65$^a$ may then be dispensed with.

The machine is drawn by two teams hitched to the whiffletrees 66 attached to swingletrees 66$^a$ link connected to draft bars 67, which have their inner ends pivoted to the main frame, and are connected by a brace-chain 68 passing over two sheaves 69 some distance back in the frame.

The front end of the elevator is provided with two outwardly-diverging arms 70, serving to gather the lower end of the shock while the upper end is gathered rearwardly by the preferably curved bars 71 of the reel 37. Said arms 70 are pivoted at 72 and have each a gap 73 engaging the projecting end of the front elevator shaft 45 so loosely that the arm has the necessary vertical play to allow for unevenness of the ground.

96 are pegs on the reel, which may be used to give it a better hold on the shocks.

The elevator frame is near its middle, provided with a knee-joint 74 to allow the frame to be bent downward sufficiently to let the front end pass over obstructions on the ground, or even to be held elevated while the machine is driven from place to place idle. Said joint 74 is held closed and the frame 43 in a straight position by a spring 75, (best shown in Fig. 4) extending between two brackets 76, 77, secured in a downward position, one to each section of the elevator frame, so that when the front end of the elevator has passed over an obstruction, said spring will at once straighten the frame again.

To the forward bracket 77 is connected by a link 78 a hand-lever 79, pivoted to the X-shaped frame and having its upper end within reach of the driver, so that he may engage the lever with the forward side of the pin 80 and thus cause the joint 74 to stay bent downward, and the front end of the elevator above all obstructions, it being remembered that the sections of the elevator frame are pivotally supported at 40 and 50, and the latter pivot is in a post 51 acting as a link on its pivot 52.

Turning now to the box or rack 42, it will be seen that it is made up of bars and slats in a skeleton manner, has a gap 81 in its front wall for the elevator frame; and the rear side is closed by a gate 82 hinged near its upper corners at 83, and having its lower corners provided with pegs 84 adapted to hold the gate closed by engaging hooks 85 fixed one at each end of a rock shaft 86 journaled along the bottom of the rack; one of said hooks has a tail end pivoted at 87 to an upwardly extending rod 88, guided in a staple 96. At the end of the rack is arranged a horizontally sliding rod 89, having in its rear end a slot 90 engaging a pin 91, fixed in the end of the gate a short distance below the hinges. The front end of the sliding bar is provided with a handle 92 of which the driver takes hold in pulling the gate shut and pushing it open; in the latter act it is necessary to first raise the hooks 85, which is done by the bend 93 on the rod 89, which acts like a cam depressing the rod 88, as it passes over the upper end of it; the slot 90 allowing the cam to so act before the gate receives the push. And in pulling the gate shut the cam passes forward of the rod 88 in due time to let the hooks 85 drop into engagement with the pins in the gate.

At the time the gate is released, the rack, which is but slightly heavier forward of its pivoting point on the axle 18, is simply given a push and it will fall backward so far that its entire contents will be discharged through the open gate. When the rack is empty it tilts forward by its own weight, or by the slight pull made at the handle 92 to insure closing of the gate. Still to guard against accidental tilting backward of the rack when the horses make a jerk, a hook 94 may be used to hold the rack detachably to the frame work in front of it.

95 represents a suitable shield to keep the load from contact with the wheels 19—19$^a$ and 27 &c.

To a further understanding of the operation of the machine it may be stated that in making a sharp turn with the machine the team at one side pulls away from the machine while the team at the other side "backs" toward the machine so as to follow its motion. One or two drivers may be used. The machine is simply drawn forward against the shocks standing on the field and the reel and the elevator pick up the shocks and transfer them into the rack, from which they are quickly unloaded by dumping as described.

What we claim as new and desire to secure by Letters Patent is:—

A shock gatherer comprising a suitable frame and wheels supporting the same, a dumping rack or box upon the rear end of the frame, and forward of the rack an inclined elevator adapted to gather up and convey the shocks into the rack, said elevator being operatively connected with one of the supporting wheels of the machine; and having its frame divided into two sections secured together by a downwardly yielding knee-joint, one of the sections being pivotally supported near its middle in the main frame and the other section being link-supported to said frame, a spring holding normally the knee-joint closed and means for bending and for holding bent the said knee-joint, for the purpose set forth.

In testimony whereof we affix our signatures, in presence of two witnesses.

MARTIN ERECKSON.
JOHN O. JYSTAD.

Witnesses:
  THORE LARSON,
  L. L. LANDE.